(12) United States Patent
Stephenson

(10) Patent No.: US 6,320,573 B1
(45) Date of Patent: Nov. 20, 2001

(54) DRIVING A MEMORY DISPLAY IN A CAMERA

(75) Inventor: Stanley W. Stephenson, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/182,924

(22) Filed: Oct. 30, 1998

(51) Int. Cl.$^7$ .............................. G09G 5/00; G03B 17/18; G03B 7/26
(52) U.S. Cl. ........................ 345/211; 345/204; 396/201; 396/205; 396/301
(58) Field of Search ............................ 354/418, 145.1; 348/64; 427/213.3; 396/301, 303, 282, 287, 176, 106, 166, 181, 201, 205, 291, 292, 159; 345/204, 207, 211, 212, 214

(56) References Cited

U.S. PATENT DOCUMENTS

| | | | |
|---|---|---|---|
| 5,027,150 | * 6/1991 | Inoue et al. | 396/303 |
| 5,276,477 | * 1/1994 | Dunsmore et al. | 396/301 |
| 5,365,305 | * 11/1994 | Seki et al. | 396/301 |
| 5,555,071 | * 9/1996 | Koenig et al. | 354/418 |
| 5,695,682 | 12/1997 | Doane et al. | |
| 5,717,308 | * 2/1998 | Nishitani et al. | 396/301 |
| 5,978,016 | * 11/1999 | Lourette et al. | 348/64 |
| 6,011,930 | * 1/2000 | Okubo et al. | 396/301 |
| 6,016,407 | * 1/2000 | Tsukahara | 396/302 |
| 6,017,584 | * 1/2000 | Albert et al. | 427/213.3 |

OTHER PUBLICATIONS

Hashimoto et al, Reflective Color Display Using Cholesteric Liquid Crystals, SID 98 Digest, 1998, pp. 897–900.

* cited by examiner

Primary Examiner—Bipin Shalwala
Assistant Examiner—David L. Lewis
(74) Attorney, Agent, or Firm—Raymond L. Owens

(57) ABSTRACT

A camera having an electronic flash unit which provides a source of high voltage and having a display for displaying an image, which includes the display including material which is effective in a first condition in response to a selectively applied high voltage for changing the state of the material to display the image and to be effective in a second condition for preventing the display of an image, the material being selected so as after displaying an image to continue to display the image after the removal of applied voltages; and circuitry for coupling and selectively applying the high voltage source in the flash unit to the display for changing the state of the material in the display to produce the image.

5 Claims, 6 Drawing Sheets

DRIVING A MEMORY DISPLAY IN A CAMERA

CROSS REFERENCE TO RELATED APPLICATIONS

Reference is made to commonly-assigned U.S. patent application Ser. No. 08/990,853 filed Dec. 15, 1997, entitled "A Sheet Having Patternable Conductive Traces for Use in a Display" by Stanley W. Stephenson; U.S. patent application Ser. No. 09/027,321 filed Feb. 20, 1998, entitled "Selectively Presenting Viewable and Conductive Images" by Stanley W. Stephenson and U.S. patent application Ser. No. 09/045,016 filed Mar. 20, 1998, entitled "Display Having Viewable and Conductive Images" by Stanley W. Stephenson, the disclosures of which are incorporated herein by reference.

FIELD OF THE INVENTION

The present invention relates to cameras having displays.

BACKGROUND OF THE INVENTION

Current silver halide film cameras have displays for indicating settings and status conditions, such as frame number, of the camera. Often, the display uses twisted nematic liquid crystals that that requires continuous electrical drive to display information. Cameras with this type of display can be turned on only for short periods of time to preserve battery life. When the cameras are turned off, the liquid crystal display goes blank. An operator must turn on the camera to determine the status of the camera. These cameras typically incorporate a high voltage power supply to drive an electronic flash built into the camera.

Many digital cameras use liquid crystal displays to display a captured image. Displays in these cameras are also nematic liquid crystals displays that can drain an electronic camera power supply in a short period of time.

SUMMARY OF THE INVENTION

Accordingly, it is an object of the present invention to provide a display in a camera that displays data, even when the power to the display is removed.

This object is achieved in a camera having an electronic flash unit which provides a source of high voltage and having a display for displaying an image, comprising:

(a) the display including material which is effective in a first condition in response to a selectively applied high voltage for changing the state of the material to display the image and to be effective in a second condition for preventing the display of an image, the material being selected so as after displaying an image to continue to display the image after the removal of applied voltages; and (b) means for coupling and selectively applying the high voltage source in the flash unit to the display for changing the state of the material in the display to produce the image.

An advantage of the present invention is that it permits the use of displays which require a high voltage source to display images.

A feature of the present invention is that the high voltage supply in the electronic flash unit can be used as a source of power for the display.

It is a feature of the present invention it permits display of images when power to the display is turned off.

It is a further feature of the present invention to provide an arrangement which reduces the consumption of power required by a camera display.

DETAILED DESCRIPTION OF THE INVENTION

Figure 1:
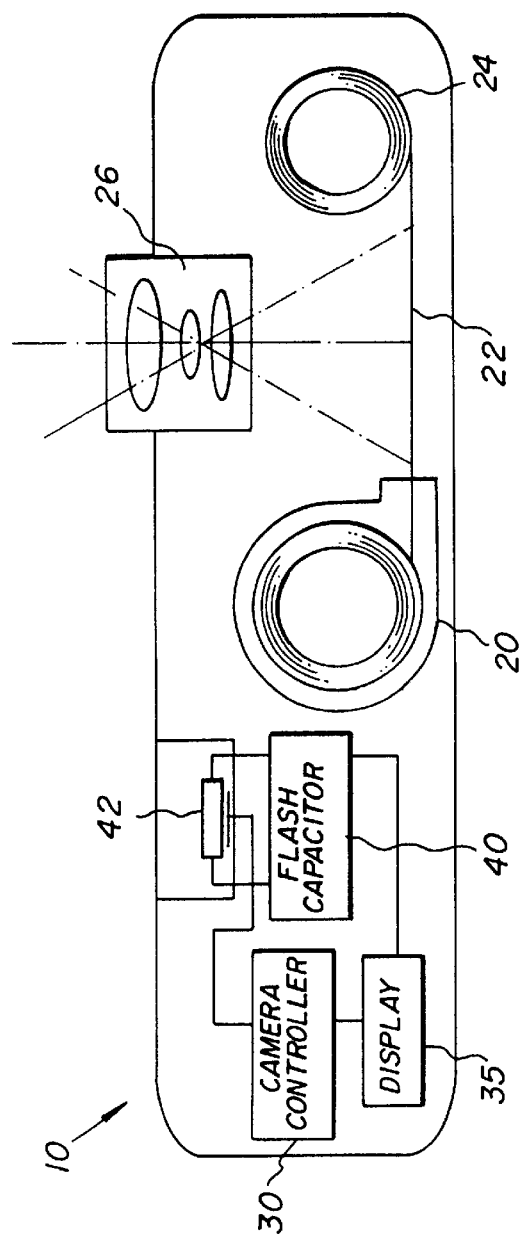
FIG. 1 is a top sectional view of a silver halide camera with a memory display in accordance with the present invention.

A top sectional view of a silver halide film camera 10 is shown in FIG. 1. A film cassette 20 in camera 10 holds a strip of film 22 that captures images from optic 26. Film 22 is sequentially taken up onto take-up spool 24 to capture a set of images. After image exposure is complete, film 22 is returned to film cassette 20. Camera controller 30 receives commands from an operator and controls the sequential motion of film 22 and optic 26. Camera controller 30 can provide supplemental illumination to a scene by discharging a high energy pulse through flash tube 42. Flash tube 42 requires a flash capacitor 40 to store energy for flash tube 42. Flash capacitor 40 typically stores energy in a capacitor having over 50 micro-farads capacitance at over 100 volts.

The status of camera 10 is shown on a display 35 in camera 10. Typically, display 35 shows the number of the current frame of film, the operational mode of flash tube 42, and operating parameters of optic 26. In more complex cameras, display 35 is a conventional nematic liquid crystal display. Nematic liquid crystal fluids act in conjunction with polarizing filters to act as a shutter to reflect or transmit light. Transmitted light is selectively reflected from a surface behind the display to provide light indicia. The reflected light provides a white indicia. When light is blocked by the polarizing filters, the imager area is dark. Nematic liquid crystals must have a continuous electrical field across the display to display information.

Figure 2:
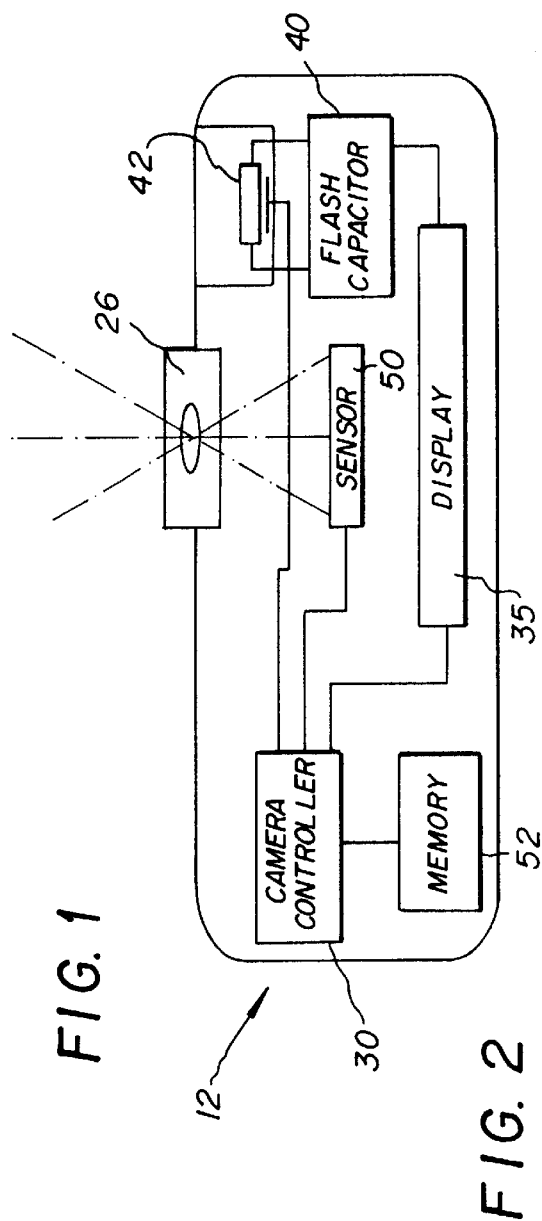
FIG. 2 is a top sectional view of an electronic capture camera with a memory display in accordance with the present invention.

FIG. 2 is a top sectional view of an electronic camera 12. Many of the components operate as in conventional camera 10. Film 22 is replaced by electronic sensor 50. Electronic sensor 50 captures a scene and camera controller 30 stores a captured image in memory 52. Display 35 in electronic camera 12 displays the status of electronic camera 12, and in certain cases displays images from memory 52. A flash tube 42 is often provided in electronic camera 12 to supply additional light to a scene at the time of image capture. Flash tube 42 requires a flash capacitor 40 to store energy for flash tube 42. Flash capacitor 40 typically stores energy in a capacitor having over 50 micro-farads capacitance at over 100 volts.

Figure 3:
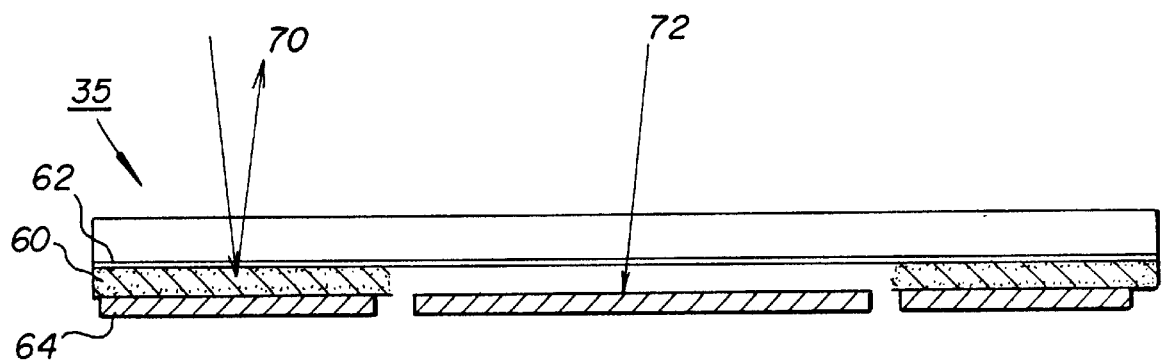
FIG. 3 is a side sectional view of the memory display of FIG. 1.

FIG. 3 is a diagram of display 35 in accordance with the present invention. Memory material 60 is disposed between a transparent top conductor 62 and a bottom conductor 64. Bottom conductor 64 can be a transparent electrical conductor such as Indium-Tin-Oxide or a light absorbing conductor formed by an oxide of a metal such as platinum or nickel. Memory material 60 can be a chiral doped nematic liquid crystal such as those disclosed in U.S. Pat. No. 5,695,682. Applied fields of various intensity and duration change the state of chiral doped nematic materials from a reflective to a transmissive state. These materials have the advantage of maintaining a given state indefinitely after the field is removed. Ambient light striking memory material can be reflected light 70, providing a "light" image or can become absorbed light 72 which provides a "dark" image.

In one experiment, two glass plates were coated with transparent Indium-Tin-Oxide (ITO) to form transparent top conductor 62 and bottom conductor 64. A laser beam was used to pattern the ITO coatings and 4 micron spacer beads were applied to one of the plates. The two plates were bonded together, with the spacer beads providing a 4 micron gap between the two plates. Black paint was applied to the back of the display over bottom conductor 64 to absorb light passing through memory material 60. The gap between the plates was filled with E. M. Industries (Hawthorne, New York) chiral nematic fluid BL126 to act as memory material 60. A 3 millisecond pulse at 100 volts across areas on transparent top conductor 62 and bottom conductor 64 would convert the BL126 memory material 60 to a reflective "bright" areas. A 3 millisecond pulse at 40 volts would clear memory material 60 so that incident light was absorbed by the black paint and create "dark" areas. Such a display can be used to display camera status on display 35 for either conventional camera 10 or electronic camera 12.

Figure 4:
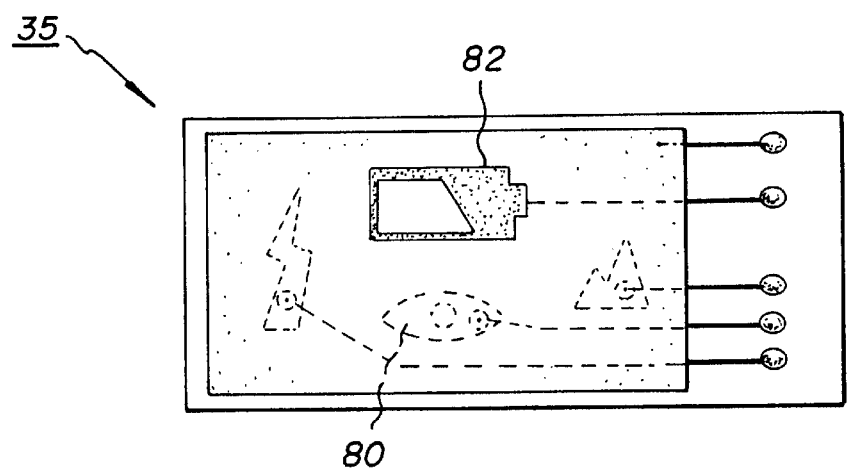
FIG. 4 is a top view of the memory display of FIG. 3.

FIG. 4 shows such display 35 having memory material 60. A reflecting segment 80 has had a 100 volt pulse applied to memory material 60. A transparent segment 82 has received a 40 volt pulse. Transparent segment 82 passes incident light to a light absorbing surface to create a dark The individual segments retain a given state indefinitely after being pulsed. A camera can be shut off and continue to have an operating display.

Figure 5:
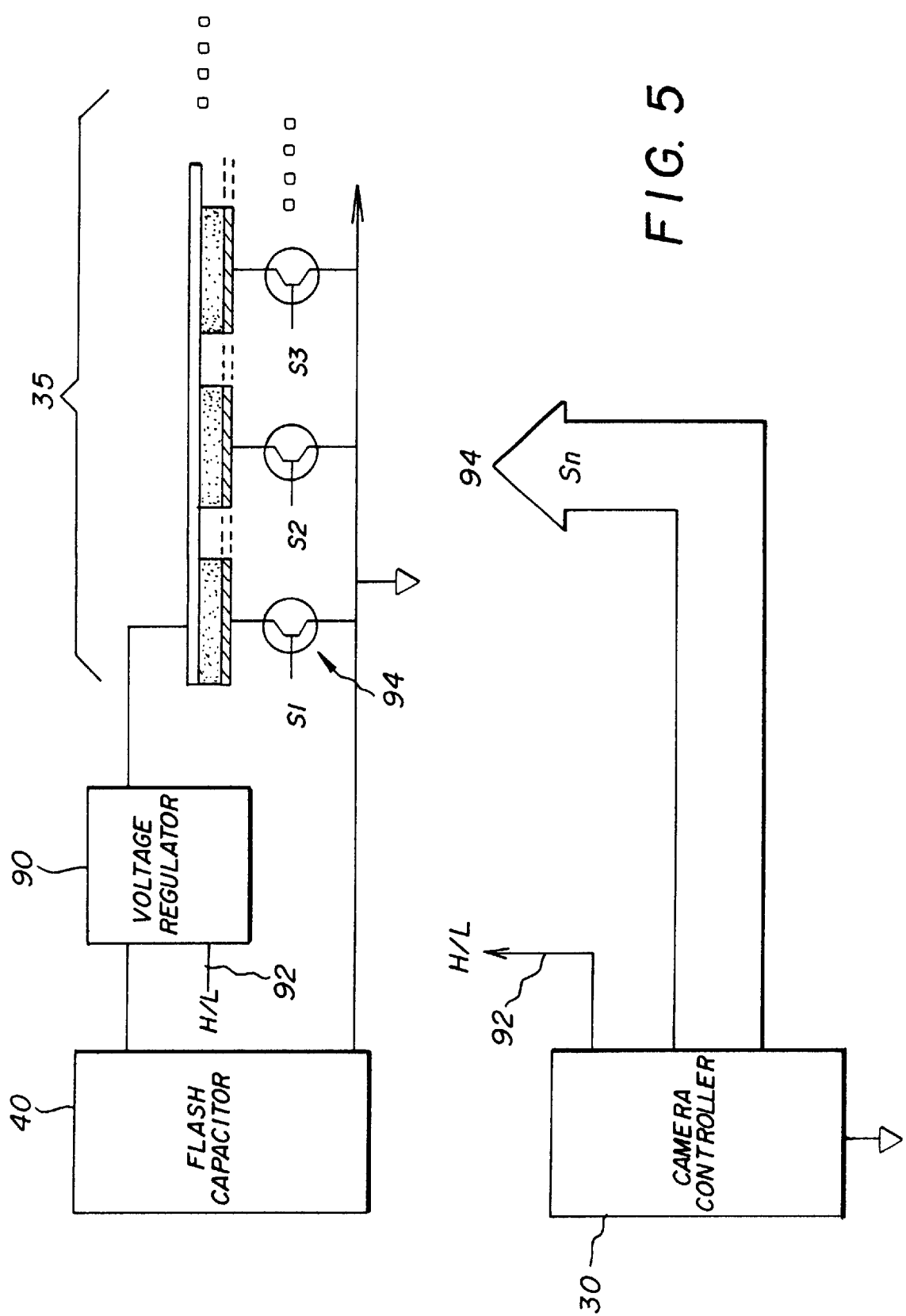
FIG. 5 shows an electrical circuit which drives the display of FIG. 3 by selectively coupling the flash unit high voltage supply to the display.

FIG. 5 is a schematic for driving display 35 in conventional camera 10. Flash capacitor 40 is used as a source of high voltage for pulsing display 35. Flash capacitor 40 stores power at well over 100 volts. Voltage regulator 90 converts a voltage from flash capacitor 40 to either a high or low voltage. In one case, voltage regulator 90 is resistor network that changes 330 volts on flash capacitor 40 to either 100 or 40 volts in response to high-low voltage select line 92 which is used by camera controller 30 to select a pulse voltage for display 35. Using the pre-existing high voltage on flash capacitor 40 eliminates the need for an additional high voltage generating system in conventional camera 10.

Figure 8A:
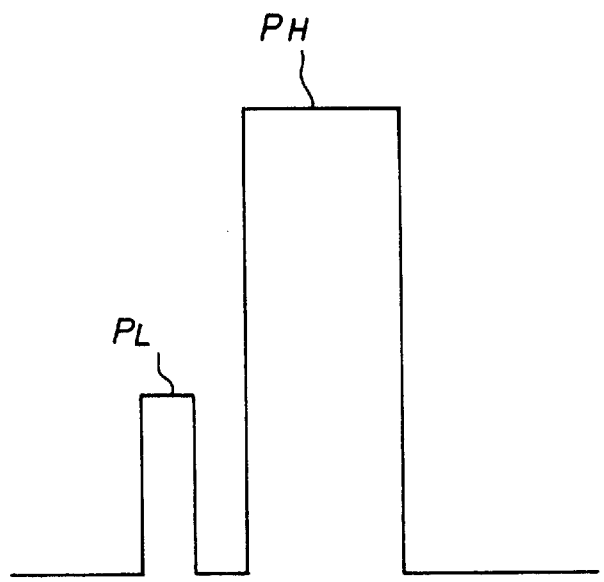
FIG. 8A is a waveform to drives a memory material to a reflecting, or bright state.
Figure 8B:
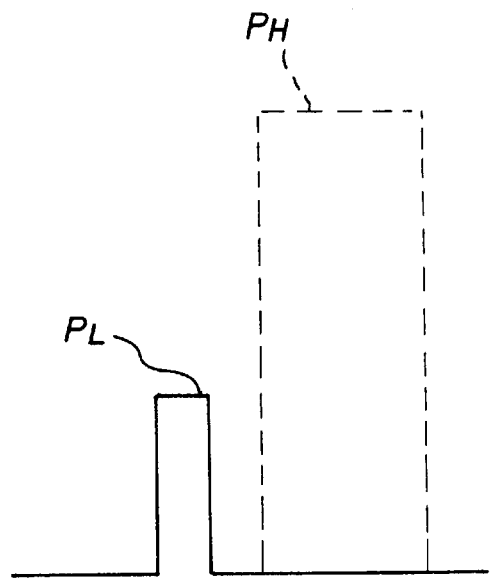
FIG. 8B is a waveform to drives a memory material to a transmitting, or dark state.

Camera controller 30 uses high-low voltage select line 92 to changes the voltage applied to display 35. Display 35 contains chiral nematic liquid crystal memory material 60 to hold either a reflective or transmissive state for each segment of display 35. FIG. 8A show the voltage forms applied by camera controller 30 to a segment of display 35 to write the segment into the reflective mode. Camera controller 30 sets voltage regulator 90 to a low voltage and pulses all segment switches 94 to clear all the segments with low voltage pulse $P_L$. Voltage regulator 90 is then set to a high voltage, and selected ones of segment drivers 94 are pulsed with a high voltage pulse $P_H$ to convert those segments to the reflective mode. FIG. 8B is waveform across a segment that has been kept in the transmissive mode. Because $P_H$ was not applied across that segment, the segment remains in a transmissive, dark state from $P_L$. After the write pulses $P_L$ and $P_H$ are applied, display 35 will continue to display status information indefinitely without the use of additional power. Conventional camera 10 can be de-energized and display 35 will continue to display information such as the number of images left on film 22.

Figure 6A:
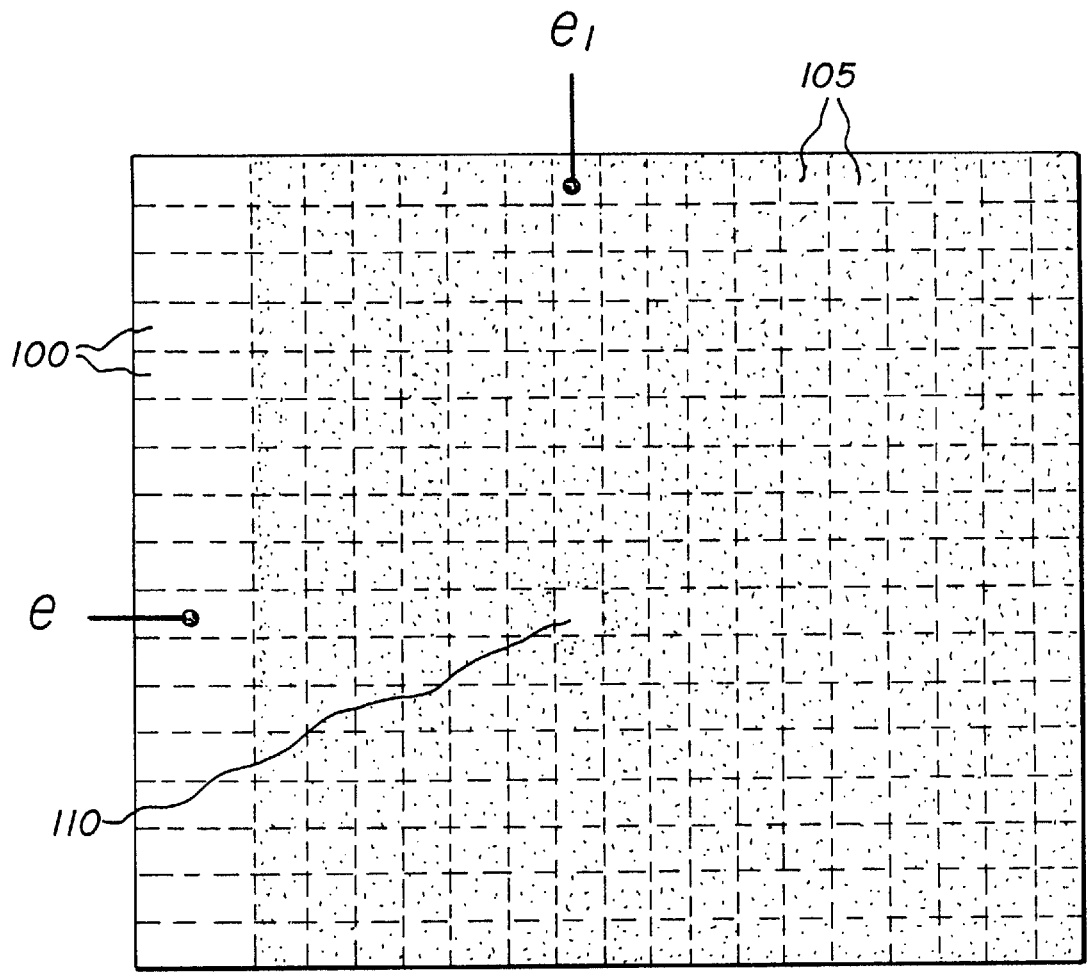
FIG. 6A is a partial top view of the memory display of the electronic capture camera of FIG. 2.
Figure 6B:
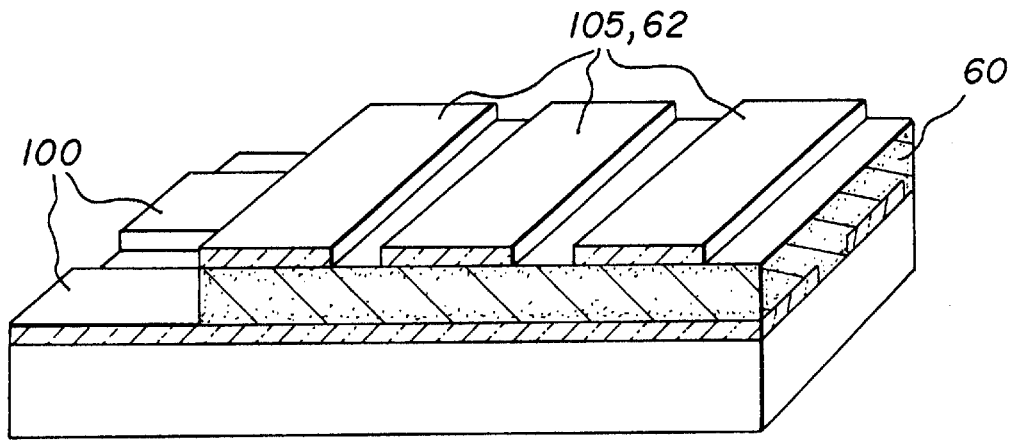
FIG. 6B is a magnified view of the memory display of FIG. 6A.

FIG. 6A is a partial top view and FIG. 6B is a magnified view of display 35 in electronic capture camera 12. A substrate supports a plurality of transparent row traces 100. A second set of transparent traces form column traces 105. A memory material 60 is disposed between row traces 100 and column traces 105. Memory material 60 is a chiral nematic material that can be written into either a reflective or transmissive state. Chiral nematic materials can be tuned to red green and blue wavelengths of reflection and three color planes can be stacked to create a full color display.

Figure 7:
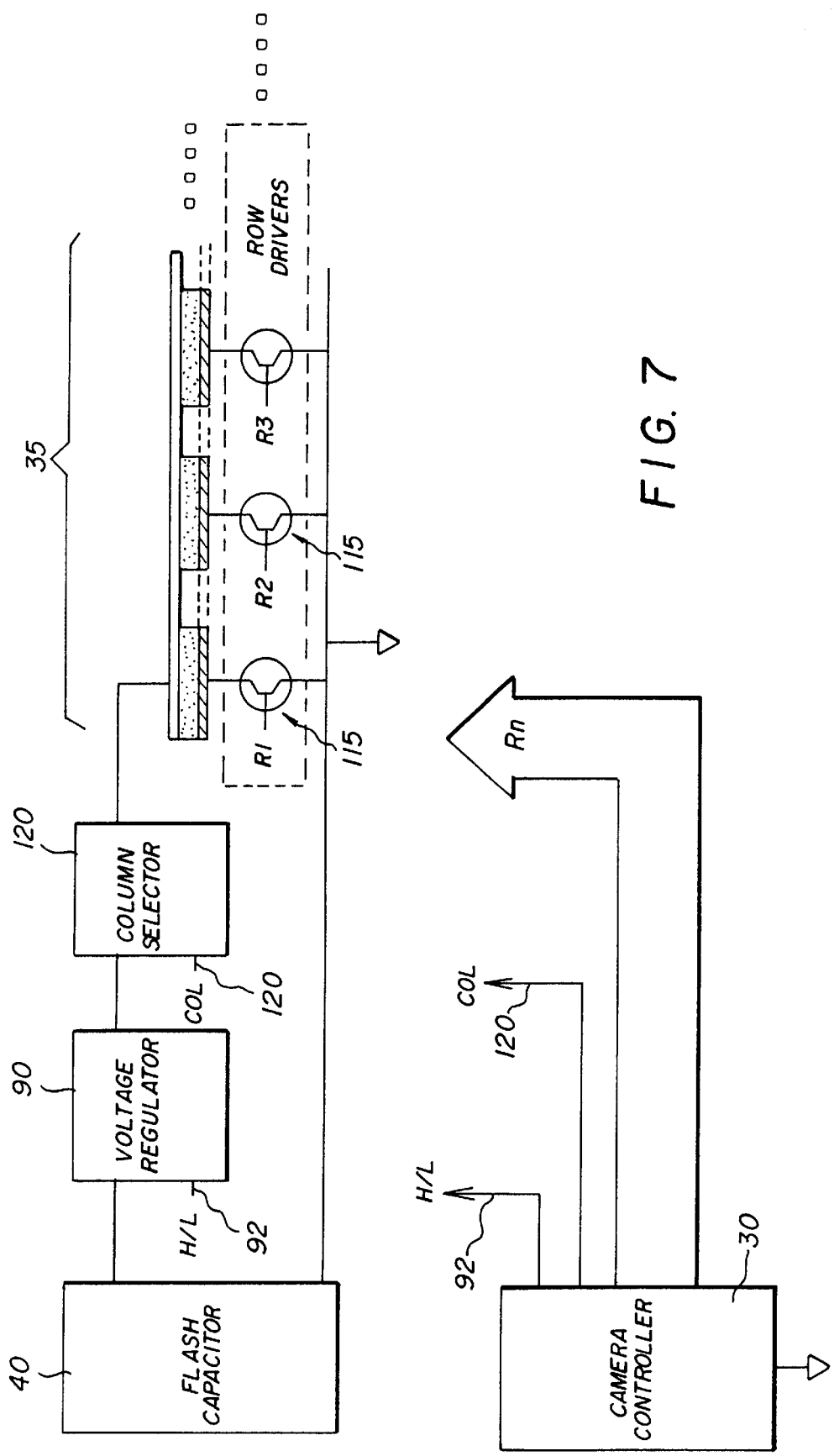
FIG. 7 is an electrical schematic circuit which drives the memory display of FIGS. 6A and 6B.

FIG. 7 is a schematic for driving display 35 in electronic camera 12. Flash capacitor 40 is used as a source of high voltage for pulses to display 35. Flash capacitor 40 stores power at well over 100 volts. Voltage regulator 90 converts a voltage from flash capacitor 40 to either a high or low voltage. In one case, voltage regulator 90 is resistor network that changes 330 volts on flash capacitor 40 to either 100 or 40 volts in response to high-low voltage select line 92. Using the pre-existing high voltage on flash capacitor 40 eliminates the need for a high voltage generating system in electronic camera 12.

Figure 8C:
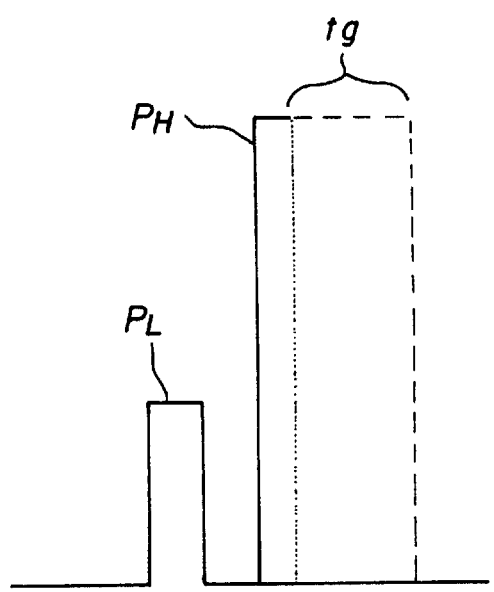
FIG. 8C is a waveform to drive a memory material to an intermediate state between transmission and reflection.

FIG. 8C is the drive signals applied across a single color plane of display 35 when used as to display a color, gray scale image stored in memory 52 using the electrical drive of FIG. 7. Camera controller 30 selects a first column using column selector 120. Camera controller 30 sets voltage regulator 90 to a low voltage, and row drivers 15 write a first clearing pulse $P_L$ to all pixels in the row. Camera controller 30 then sets voltage regulator 90 to a high voltage. Row drivers 115 are energized for various gray level times tg. A chiral nematic material changes state from the transmissive to the reflective state progressively over time. By selecting an appropriate drive time tg for each pixel, a column of pixels can be written to various degrees of reflection, creating a column of pixels written to various gray levels. Camera controller 30 uses to column selector 120 to select the next column of pixels for writing. The process is repeated for each column, and each color plane to create a full-color, gray scale image on display 35. Other driving schemes can be used such as one proposed by Hashimoto et al, "Reflective Color Display Using Cholesteric Liquid Crystals", SID 98 Digest, Article 31.1, 1998, pp. 897–900.

The invention has been described in detail with particular reference to certain preferred embodiments thereof, but it will be understood that variations and modifications can be effected within the spirit and scope of the invention.

PARTS LIST 10 conventional camera
12 electronic camera
20 film cassette
22 film
24 take-up spool
26 optic 30 camera controller
35 display
40 flash capacitor
42 flash tube
50 sensor
52 memory
60 memory material
62 transparent top conductor
64 bottom conductor
70 reflected light
72 absorbed light
80 reflecting segment
82 transmitting segment
90 voltage regulator
92 high-low voltage select
94 segment switch
100 row traces
105 column traces
110 pixel
115 row drivers
120 column selector

What is claimed is:

1. A camera having an electronic flash unit which provides a source of high voltage and having a display for displaying an image, comprising:
   (a) the display including material which is effective in a first condition in response to a selectively applied high voltage for changing the state of the material to display the image and to be effective in a second condition for preventing the display of an image, the material being selected so as after displaying an image to continue to display the image after the removal of applied voltages; and
   (b) means for coupling and selectively applying the high voltage source in the flash unit to the display for changing the state of the material in the display to produce the image.

2. The camera of claim 1 wherein the material includes a chiral nematic liquid crystal.

3. A camera having an electronic flash unit which provides a source of high voltage and having a display for displaying an image, comprising:
   (a) the display including material which is effective in response to a selectively applied high voltage for changing the state of the material to display the image and having:
      (i) a substrate; and
      (ii) a light modulating layer formed over the substrate and including the material including material which is effective in a first condition in response to a selectively applied high voltage for changing the state of the material to display the image and to be effective in a second condition for preventing the display of an image, the material being selected so as after displaying an image to continue to display the image after the removal of applied voltages; and
   (b) electrical conduction means connected to the display for coupling and selectively applying the high voltage source in the flash unit to the display for changing the state of the material in the display to produce the image.

4. The camera of claim 3 wherein the electrical conduction means includes a plurality of overlapping row and column traces which intersect at pixel positions and wherein the high voltage is selectively applied to such pixel positions.

5. The camera of claim 3 wherein the electrical conduction means applies a pulses of high voltage to the display to cause it to be effective in the first condition and to remain in such condition until pulses of lower voltage are applied.

* * * * *